US012359468B2

(12) United States Patent
Li

(10) Patent No.: US 12,359,468 B2
(45) Date of Patent: Jul. 15, 2025

(54) LOCK FACILITATING DOUBLE-LOCKING FROM OUTSIDE

(71) Applicant: Shenzhen SeamoonCloud Technology Co., Ltd., Guangdong (CN)

(72) Inventor: Chunlan Li, Shenzhen (CN)

(73) Assignee: Shenzhen SeamoonCloud Technology Co., Ltd., Shenzhen (CN)

( * ) Notice: Subject to any disclaimer, the term of this patent is extended or adjusted under 35 U.S.C. 154(b) by 352 days.

(21) Appl. No.: 18/053,750

(22) Filed: Nov. 8, 2022

(65) Prior Publication Data

US 2023/0167656 A1 Jun. 1, 2023

(30) Foreign Application Priority Data

Nov. 30, 2021 (CN) ......................... 202122994544.2

(51) Int. Cl.
*E05B 15/00* (2006.01)
*E05B 55/00* (2006.01)
*E05B 63/00* (2006.01)

(52) U.S. Cl.
CPC ...... *E05B 63/0017* (2013.01); *E05B 15/0013* (2013.01); *E05B 15/0026* (2013.01); *E05B 15/0033* (2013.01); *E05B 55/005* (2013.01)

(58) Field of Classification Search
CPC .. E05B 63/0017; E05B 5/0013; E05B 5/0026; E05B 5/0033; E05B 55/005
See application file for complete search history.

(56) References Cited

U.S. PATENT DOCUMENTS 11,168,490 B2 * 11/2021 Huang ................ E05B 17/0004
11,795,730 B2 * 10/2023 Hood ...................... E05B 41/00
2010/0154493 A1 * 6/2010 Yang .................. E05B 73/0082
70/345

* cited by examiner

*Primary Examiner* — Kristina R Fulton
*Assistant Examiner* — Thomas L Neubauer
(74) *Attorney, Agent, or Firm* — True Shepherd LLC; Andrew C. Cheng

(57) ABSTRACT

The invention belongs to the technical field of locks, and particularly relates to a lock facilitating double-locking from the outside. The lock comprises a cylinder, a cylinder follower, and a bolt component. The lock further comprises a rotating handle, a fixing part fixedly connected with an external supporting surface, a rotating part fixedly connected with the rotating handle and movably connected with the fixing part, a stopper arranged on the fixing part and movably connected with the rotating part, and an adapter movably connected with the rotating part and connected with the cylinder follower. The structure facilitates double-locking from the outside. A restoration structure for restoring the cylinder is not needed. Therefore, the structure is simple, cost is low, the adapter is easy to mount and dismount, a user can adjust the installation mode of the adapter and the cylinder follower, and even non-professionals can install the lock.

11 Claims, 9 Drawing Sheets

LOCK FACILITATING DOUBLE-LOCKING FROM OUTSIDE

CROSS REFERENCE OF RELATED APPLICATION

This is a non-provisional application which claimed priority of Chinese application number 2021229945442, filing date 11/30/2021. The contents of these specifications are incorporated herein by reference.

BACKGROUND OF THE PRESENT INVENTION

The invention relates to the technical field of locks, in particular to a lock facilitating double-locking from the outside without a key.

DESCRIPTION OF RELATED ARTS

Locks are widely used. Common locks include door locks. When people go out, to better prevent theft, doors are often double-locked. However, currently, double-locking can be realized only with the help of keys, which is extremely inconvenient. The Chinese utility model patent CN209653589U discloses a lock, which can realize double-locking from the outside by a knob connected with a cylinder. Though double-locking from the outside without the help of keys is convenient, there are also shortcomings. Because the knob is connected with the cylinder, after the cylinder is rotated for double-locking, the cylinder needs to be restored to the original position by means of a restoration mechanism, so that a door can still be unlocked from the outside with a key, and this requires a complicated structure of the lock and high cost. In terms of installation, in order to adapt to specific application scenarios including left-handed doors and right-handed doors, professionals are needed to adjust the structure of the lock, or locks need to be selected based on whether a door is a left-handed door or a right-handed door, so inconvenience still exists.

SUMMARY OF THE PRESENT INVENTION

In order to overcome the shortcomings of the prior art, the invention provides a lock facilitating double-locking from the outside, aiming to solve the technical problems of existing locks that the structure is complex and installation is inconvenient.

To achieve the above purpose, the technical scheme adopted by the invention is as follows. A lock facilitating double-locking from the outside comprises a cylinder, a cylinder follower arranged at a front end of the cylinder, and a bolt component connected with the cylinder follower; and further comprises a rotating handle;

- a fixing part fixedly connected with an external supporting surface, the rotating handle being able to rotate relative to the fixing part;
- a rotating part fixedly connected with the rotating handle and movably connected with the fixing part;
- a stopper arranged on the fixing part, movably connected with the rotating part, and used for limiting a rotation angle of the rotating part relative to the fixing part; and
- an adapter movably connected with the rotating part, connected with the cylinder follower, and moving with the cylinder follower; wherein when the rotating part rotates, the adapter is pushed to rotate, so as to drive the cylinder follower to rotate to realize double-locking.

Preferably, the cylinder follower is arranged in an axial direction of the rotating handle, the fixing part and the rotating part are both provided with axial through holes, and the fixing part, the rotating part and the adapter are all sleeved on the cylinder follower.

Preferably, the rotating handle is cylindrical, with an opening at one end and a sealing end plate at the other end.

Preferably, the rotating part comprises a main body, a cylindrical body arranged on one surface of the main body, and an arc-shaped section with an arc-shaped cross profile arranged on an inner wall of the cylindrical body, an arc-shaped limiting groove is also formed in the surface of the main body, and the limiting groove is located outside the cylindrical body.

Preferably, the main body is in the shape of a disc, the cylindrical body is coaxial with the main body, the axial through hole in the rotating part runs through the cylindrical body and the main body in the axial direction, the arc-shaped section is integrally formed with the cylindrical body, and a central angle corresponding to the limiting groove is a, and $90° < a < 180°$.

Preferably, the adapter is provided with a cross through hole inside, the cross through hole consists of two straight holes which are perpendicular to each other, and the cylinder follower passes through one of the straight holes.

Preferably, the adapter is integrally formed by a large arc block and a small arc block, two sides of the large arc block protrude from two sides of the small arc block, and two contact vertical faces are formed on the two sides of the large arc block respectively.

Preferably, the adapter is placed in the cylindrical body and rotates clockwise or counterclockwise relative to the cylindrical body with the cylinder follower as the axis; and when the adapter rotates, after one of the contact vertical faces contacts one end face of the arc section, the adapter stops rotating relative to the cylindrical body, and at this point, a space of not less than 90° exists between the other contact vertical face and another end face of the arc-shaped section for the adapter to rotate reversely.

Preferably, a circumferential surface of the large arc block of the adapter is in contact with the inner wall of the cylindrical body, and a surface of the arc section is an arc-shaped surface, which is in contact with a circumferential surface of the small arc block.

Preferably, the fixing part is in the shape of a disc, a circular counter bore is formed in one surface of the fixing part, the cylindrical body is sleeved with a bearing, the main body of the rotating part is embedded in the circular counter bore, the bearing is embedded in the axial through hole of the fixing part, and the rotating part can rotate relative to the fixing part.

Preferably, the fixing part is provided with two stopper mounting positions, the stopper is a screw which vertically passes through the fixing part via one of the mounting positions on the fixing part and is fixed on the fixing part, and a free end of the stopper extends into the limiting groove to limit a maximum range of rotation of the rotating part relative to the fixing part.

Preferably, the fixing part is arranged in the open end of the rotating handle, and further comprises a bottom plate fixedly connected with the external supporting surface, and the bottom plate is detachably connected with the fixing part.

Preferably, a detachable bottom plate gasket is further arranged on a surface of the bottom plate, the bottom plate and the bottom plate gasket are coaxial with the rotating handle, the rotating part and the fixing part, and axial through holes for the cylinder follower to pass through are also formed in the bottom plate and the bottom plate gasket.

Preferably, an outer surface of the adapter protrudes out of the cylindrical body and extends into the axial through hole of the bottom plate, and a diameter of the axial through hole in the bottom plate gasket is smaller than a maximum transverse or longitudinal size of the adapter, so as to prevent the adapter from moving or falling off along the axial direction of the cylindrical body.

Preferably, the rotating handle is provided with two connecting columns parallel to the axial direction of the rotating handle inside, the connecting columns are provided with axial threaded holes inside, and the main body of the rotating part is fixed on the two connecting columns by two screws.

Preferably, a circular fixed piece is fixedly arranged on a back of the fixing part, an inner diameter of the fixed piece is smaller than an outer diameter of the main body, and the rotating part is fixed in the fixing part along the axial direction of the fixing part.

The lock has the beneficial effects that the lock at least comprises the cylinder, the cylinder follower with one end connected with the cylinder, the door opening knob arranged at the other end of the cylinder follower and installed on an indoor side of a door, and the bolt component. Before double-locking, the lock must be in an unlocked state, and a rotation direction of the cylinder follower during unlocking is opposite to that during double-locking; at this point, to realize double-locking, the rotating handle is rotated outdoors, which drives the rotating part fixedly connected therewith, the rotating part rotates relative to the fixing part, and the maximum range of rotation of the rotating part is limited by the stopper; at the same time, the rotating part pushes the adapter to rotate relative to the fixing part, and the adapter drives the cylinder follower to rotate in a direction opposite to the rotating direction of the cylinder follower during unlocking, and the cylinder follower drives the bolt component connected therewith and moving therewith to move, that is, to make a bolt extend outwards and enter a lock hole in a fixed surface such as a door frame, thus realizing double-locking; in this process, rotation angles of the cylinder follower and the adapter are not less than 90°, and double-locking can be realized without the help of the cylinder; to unlock with a key from the outside or with the door opening knob from the inside, the cylinder rotates to drive the cylinder follower to rotate in a direction opposite to the double-locking direction, and the adapt rotates with the cylinder follower relative to the rotating part, and at this point, the adapter pushes the rotating part to rotate relative to the fixing part within a range allowed by the stopper; and in the unlocking process, reverse rotation angles of the cylinder follower and the adapter are not less than 90°. By means of the structure, double-locking from the outside is facilitated, and in the double-locking process, the cylinder follower is driven to rotate without the help of the cylinder structure, so there is no need to provide a restoration structure to restore the cylinder. Therefore, the invention has the advantages that the structure is simple, cost is low, the adapter is easy to mount and dismount, a user can adjust the installation mode of the adapter and the cylinder follower according to the door opening direction, and even non-professionals can install the lock.

DETAILED DESCRIPTION OF THE PREFERRED EMBODIMENT

In order to make those having ordinary skill in the art better understand the scheme of the invention, the invention will be explained in further detail below with reference to attached drawings and embodiments.

In the following description, outdoor may be understood as outside the door, and indoor may be understood as inside the door.

Figure 1:
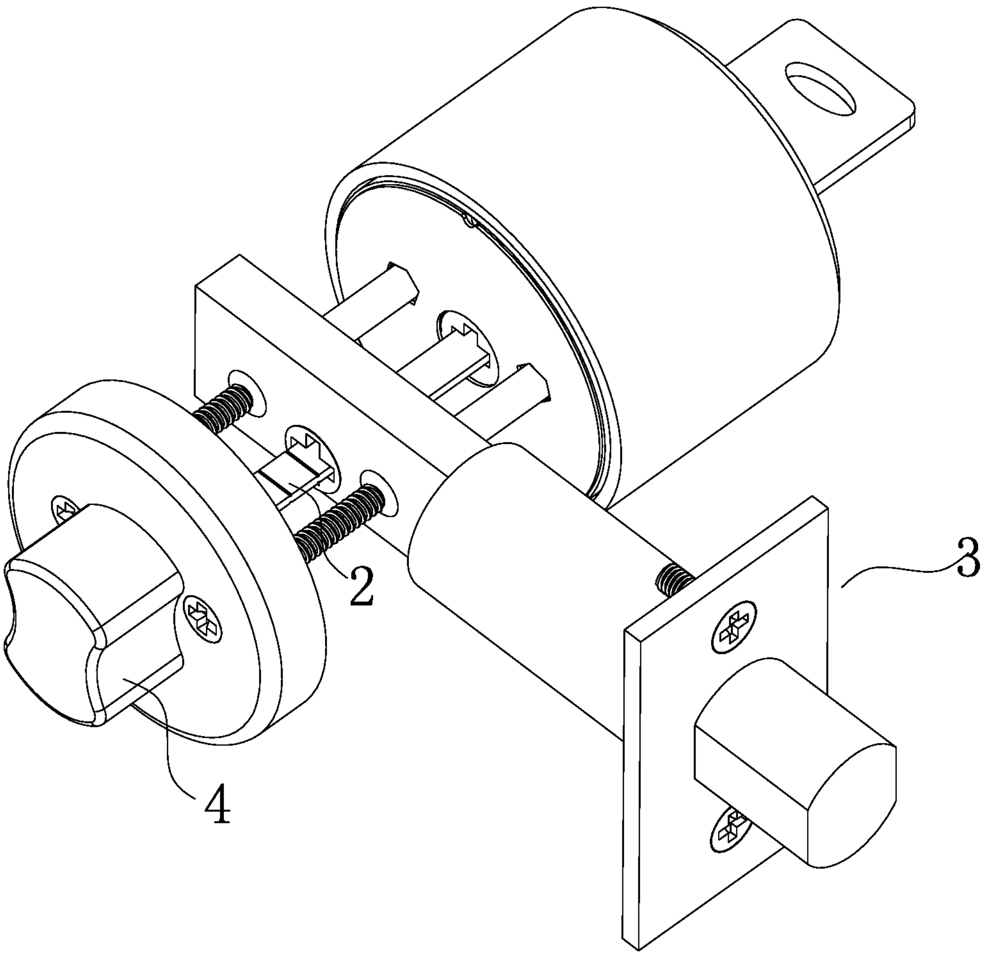
FIG. 1 is a perspective view of a lock according to an embodiment of the invention.
Figure 2:
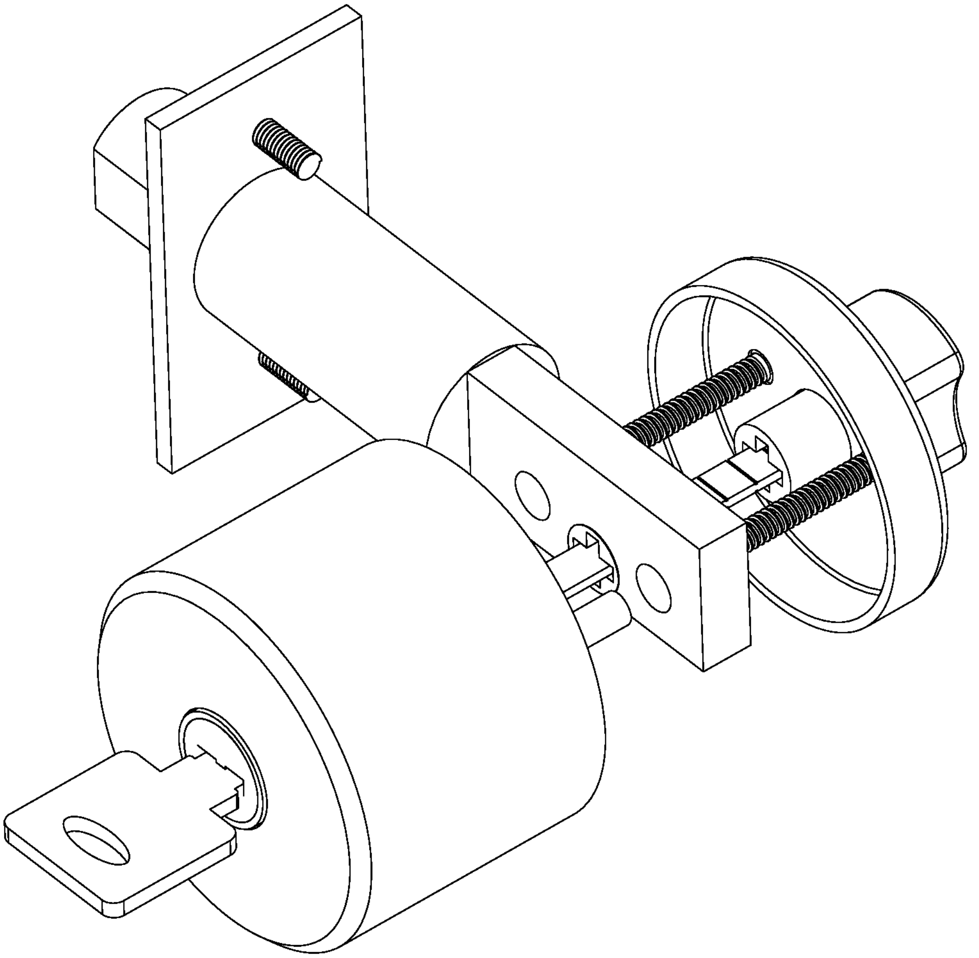
FIG. 2 is a perspective view of a lock according to an embodiment of the invention from another angle.
Figure 3:
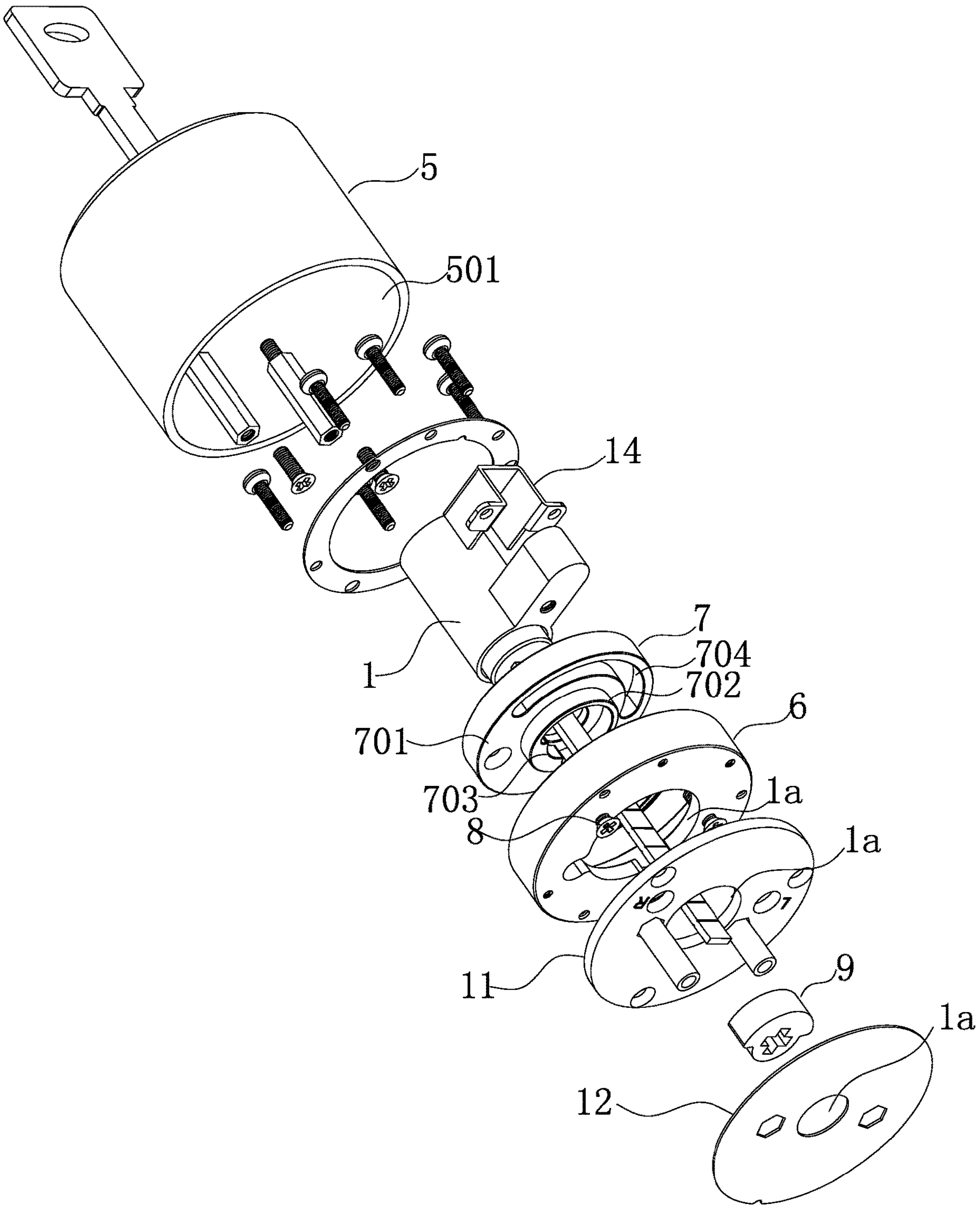
FIG. 3 is an exploded view of a structure related to double-locking on a lock according to an embodiment of the invention.

As shown in FIGS. 1-3, an embodiment of the invention provides a lock facilitating double-locking from the outside, which comprises a cylinder 1, a cylinder follower 2 arranged at a front end of the cylinder, and a bolt component 3 connected with the cylinder follower 2, wherein an inner end of the cylinder follower 2 is provided with an indoor door opening knob 4. When a torsion is directly applied to the cylinder follower 2, the cylinder follower can rotate 180° relative to the cylinder 1 instead of driving the cylinder 1 to rotate. However, when the cylinder 1 is rotated with a key, the cylinder 1 drives the cylinder follower 2 to rotate synchronously, thus driving a bolt to realize unlocking.

The lock also comprises a rotating handle 5 which is used when double-locking from the outside; a fixing part 6 fixedly connected with an external supporting surface, wherein the rotating handle 5 can rotate relative to the fixing part 6, the external support surface here refers to an installation surface of the lock, for example, when the lock is installed on a door, the door is a fixed supporting surface, and the fixing part here is used to fix a double-locking mechanism on the door; a rotating part 7 fixedly connected with the rotating handle 5 and movably connected with the fixing part 6, wherein when the rotating handle 5 rotates, the rotating part 7 is driven to rotate synchronously, the rotating part 7 being movably connected with the fixing part 6 means that the rotating part can rotate relative to the fixing part, the rotating part and the fixing part are arranged coaxially, and in the axial direction, the two are actually fixedly connected, that is, the rotating part 7 cannot move relative to the fixing part 6 in the axial direction; a stopper 8 arranged on the fixing part and movably connected with the rotating part, and used for limiting a rotation angle of the rotating part 7 relative to the fixing part 6; and an adapter 9 movably connected with the rotating part 7, connected with the cylinder follower 2 and moving with the cylinder follower 2, wherein when the rotating part 7 rotates, the adapter 9 is pushed to rotate, so as to drive the cylinder follower 2 to rotate to realize double-locking, and the adapter moving with the cylinder follower means that the adapter 9 and the cylinder follower 2 rotate synchronously. Here, when the rotating part 7 rotates, the adapter 9 can be pushed to rotate, and at the same time, the adapter 9 can push the rotating part 7 to rotate. The purpose is that when a key is used for unlocking, the cylinder 1 will drive the cylinder follower 2 to rotate, the adapter 9 will rotate along, and if the adapter 9 is in contact with the rotating part 7 and located on a rotation path of the adapter 9 at this point, the rotating part 7 will rotate along, thus preventing the adapter 9 from being blocked to affect the unlocking operation. Further, a moving space is required in the rotating part 7 so that the adapter 9 can rotate relative to the rotating part 7, and the moving space can make an angle of counterclockwise or clockwise rotation of the adapter 9 relative to the rotating part 7 not less than 90°. The adapter 9 being movably connected with the rotating part 7 means that the adapter 9 can rotate relative to the rotating part 7, but the two cannot move relative to each other in the axial direction.

In this embodiment, as shown in FIGS. 1-4, specifically, the rotating handle 5 is cylindrical, with an opening 501 at one end and a sealing end plate 502 at the other end. A central hole 502*a* is formed in the sealing end plate 502 in the axial direction of the rotating handle 5, from which a lock hole of the cylinder 1 is exposed.

The fixing part 6 and the rotating part 7 are both provided with axial through holes 1*a*, and the fixing part, the rotating part and the adapter 9 are all sleeved on the cylinder follower 2.

As shown in FIG. 3, the rotating part 7 comprises a main body 701, a cylindrical body 702 arranged on one surface of the main body, and an arc-shaped section 703 with an arc-shaped cross profile arranged on an inner wall of the cylindrical body, an arc-shaped limiting groove 704 is also formed in the surface of the main body 701, and the limiting groove 704 is located outside the cylindrical body 702. Here, the main body 701 is integrally formed with the cylindrical body 702.

Figure 8:
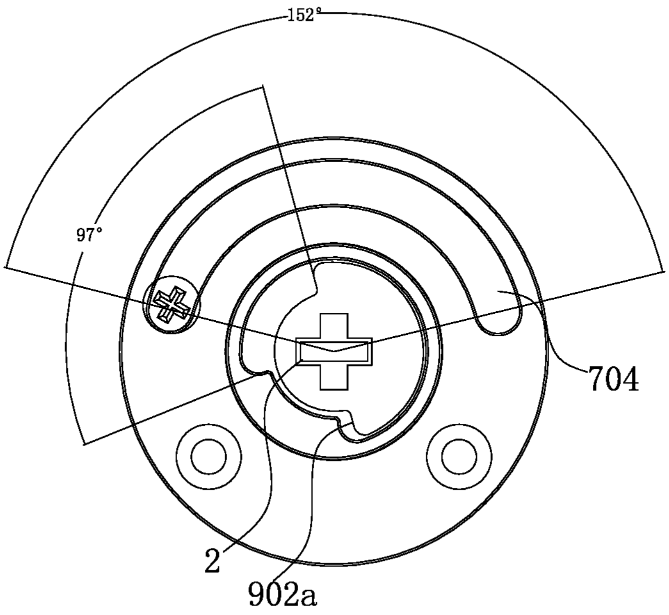
FIG. 8 is an assembly diagram of a rotating part and an adapter when a lock of the embodiment of the invention is opened in the case of a left-handed door.

Specifically, the main body 701 is in the shape of a disc, the cylindrical body 702 is coaxial with the main body 701, the axial through hole 1*a* in the rotating part 7 runs through the cylindrical body 702 and the main body 701 in the axial direction, the arc-shaped section 703 is integrally formed with the cylindrical body 702, and a central angle corresponding to the limiting groove 704 is a, and 90°<a<180°, as shown in FIG. 8, for example, the central angle here is 152°, which is not particularly limited within this range, as long as when the rotating part 7 rotates with the adapter 9, such as when unlocking with a key or when the rotating handle 5 drives the rotating part 7 to rotate for double-locking, the rotating part has enough moving space.

Figure 5:
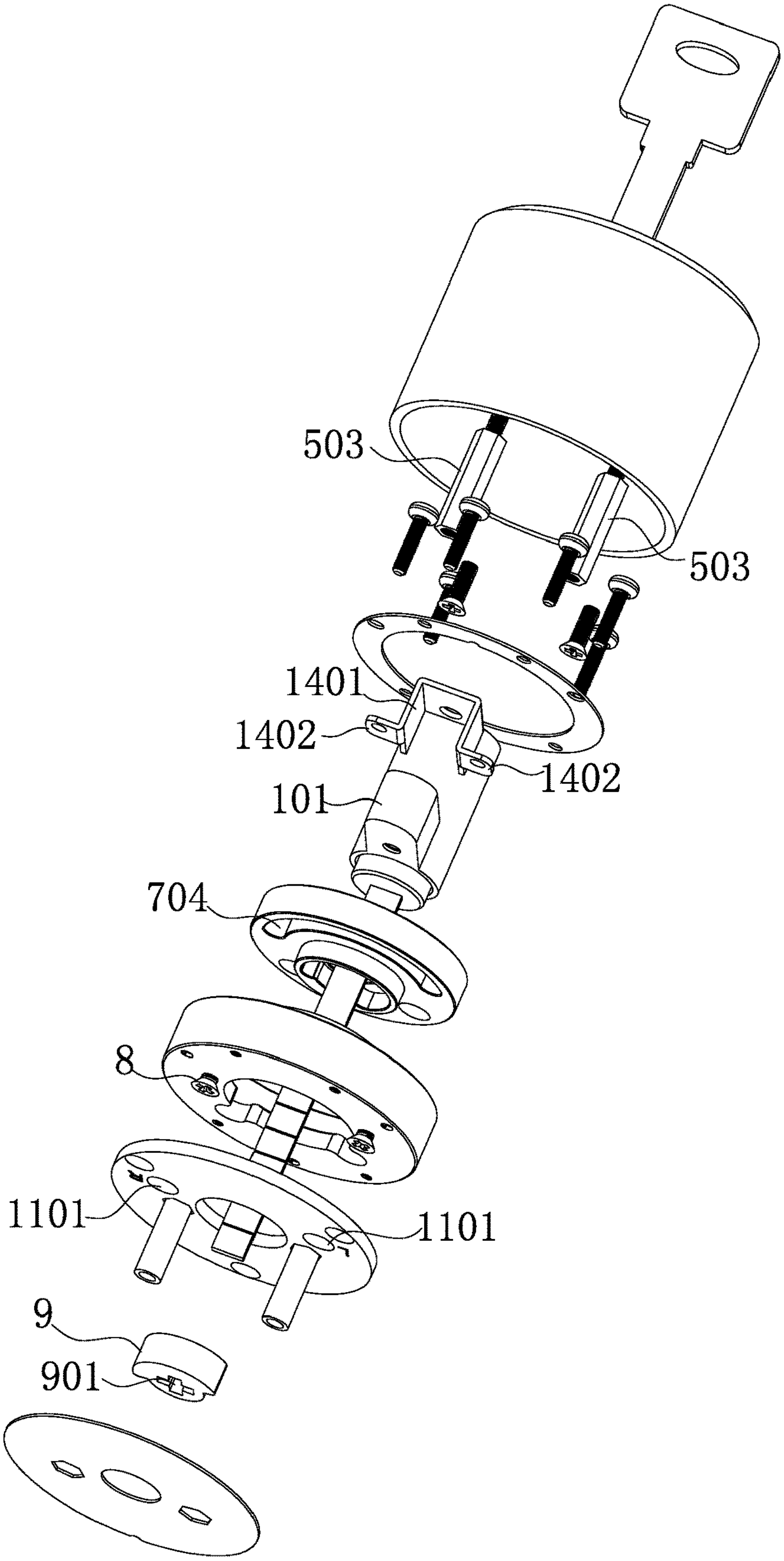
FIG. 5 is another exploded view of a structure related to double-locking on a lock according to an embodiment of the invention.

As shown in FIG. 5, the adapter 9 is provided with a cross through hole inside 901, the cross through hole consists of two straight holes which are perpendicular to each other, and the cylinder follower 2 passes through one of the straight holes. The bolt component 3 is also provided with a cross through hole for the cylinder follower 2 to pass through. For the two straight holes with different directions in the cross through hole 901, the cylinder follower 2 passes through different straight holes corresponding to different door opening directions. For example, the cylinder follower 2 passes through one straight hole in the case of a left-handed door, and the cylinder follower 2 passes through the other straight hole in the case of a right-handed door. Therefore, after purchasing the lock, a user can adjust the straight hole matched with the cylinder follower 2 according to the opening direction of the door.

Figure 4:
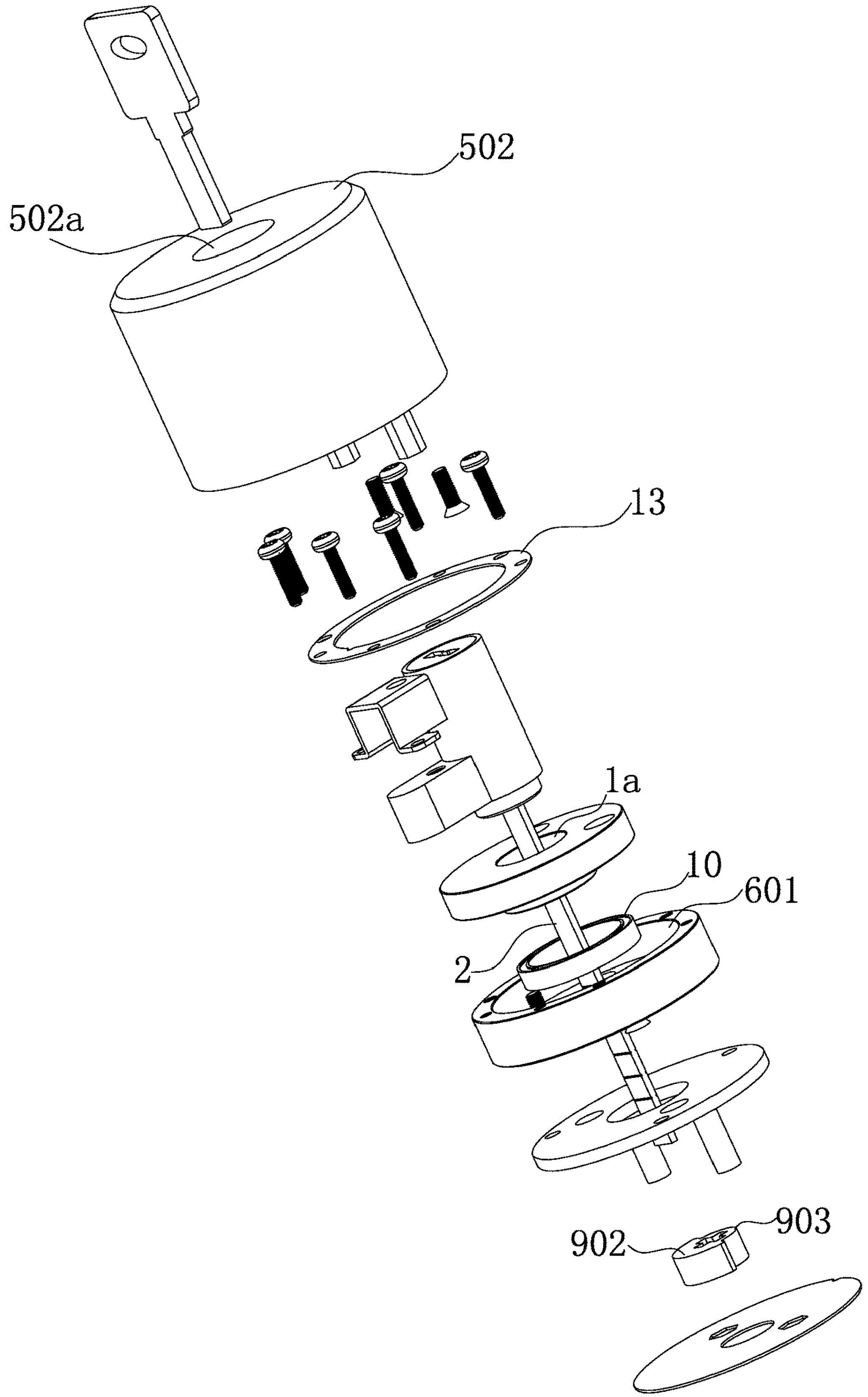
FIG. 4 is another exploded view of a structure related to double-locking on a lock according to an embodiment of the invention.

Specifically, as shown in FIG. 4, the adapter 9 is integrally formed by a large arc block 902 and a small arc block 903, two sides of the large arc block 902 protrude from two sides of the small arc block 903, and two contact vertical faces 902*a* are formed on the two sides of the large arc block respectively, as shown in FIG. 8. A thickness of the adapter 9 is larger than a height of the cylindrical body 702, so part of the adapter 9 is located outside the cylindrical body 702.

Figure 9:
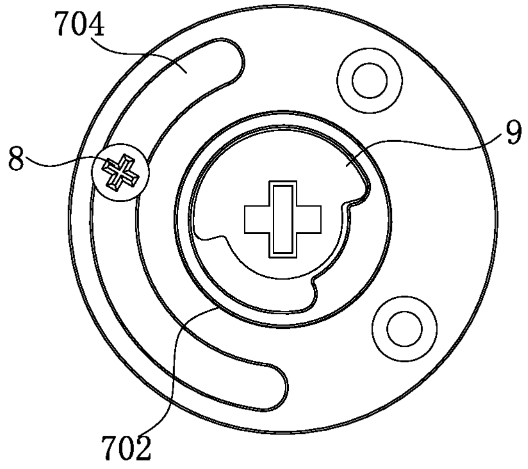
FIG. 9 is an assembly diagram of a rotating part and an adapter when a lock of the embodiment of the invention is double-locked in the case of a left-handed door.

Specifically, during assembly, the adapter 9 is placed in the cylindrical body 702 and rotates clockwise or counter-clockwise relative to the cylindrical body 702 with the cylinder follower 2 as the axis; and when the adapter 9 rotates, after one of the contact vertical faces 902*a* contacts one end face of the arc section 703, the adapter 9 stops rotating relative to the cylindrical body 702, and at this point, the adapter 9 is stationary or pushes the rotating part 7 to rotate integrally through the cylindrical body 702; and in this case, a moving space of not less than 90° exists between the other contact vertical face 902*a* on the adapter 9 and another end face of the arc-shaped section 703 for the adapter 9 to rotate reversely, so as to drive the cylinder follower 2 under certain conditions to realize double-locking, as shown in FIGS. 8-9.

As shown in FIGS. 8-9, a circumferential surface of the large arc block 902 of the adapter 9 is in contact with the inner wall of the cylindrical body 702, and a surface of the arc section 703 is an arc-shaped surface, which is in contact with a circumferential surface of the small arc block 903.

As shown in FIGS. 3-5, the fixing part 6 is in the shape of a disc, a circular counter bore 601 is formed in one surface of the fixing part, the cylindrical body 702 is sleeved with a bearing 10, the main body 701 of the rotating part 7 is embedded in the circular counter bore 601, the bearing 10 is embedded in the axial through hole 1*a* of the fixing part 6, and the rotating part 7 can rotate relative to the fixing part 6.

As shown in FIG. 5, the fixing part is provided with two stopper mounting positions, the stopper 8 adopted in this embodiment is a screw which vertically passes through the fixing part 6 via one of the mounting positions on the fixing part 6 and is fixed on the fixing part, and a free end of the stopper 8 extends into the limiting groove 704 to limit a maximum range of rotation of the rotating part 7 relative to the fixing part 6. Here, it should be noted that the two stopper mounting positions are the positions of the two limit screws in the figure, which are two mounting holes. The stopper 8 can be installed at any one of the two stopper mounting positions according to the door opening direction, and only one stopper 8 needs to be installed at one of the mounting positions, instead of installing one stopper 8 at each of the two stopper mounting positions. Here, the stopper is a screw.

FIGS. 8-9 show the position of the stopper 8 in the case of a left-handed door, and in this state, a left end of the limiting groove 704 can reach the stopper 8.

Figure 6:
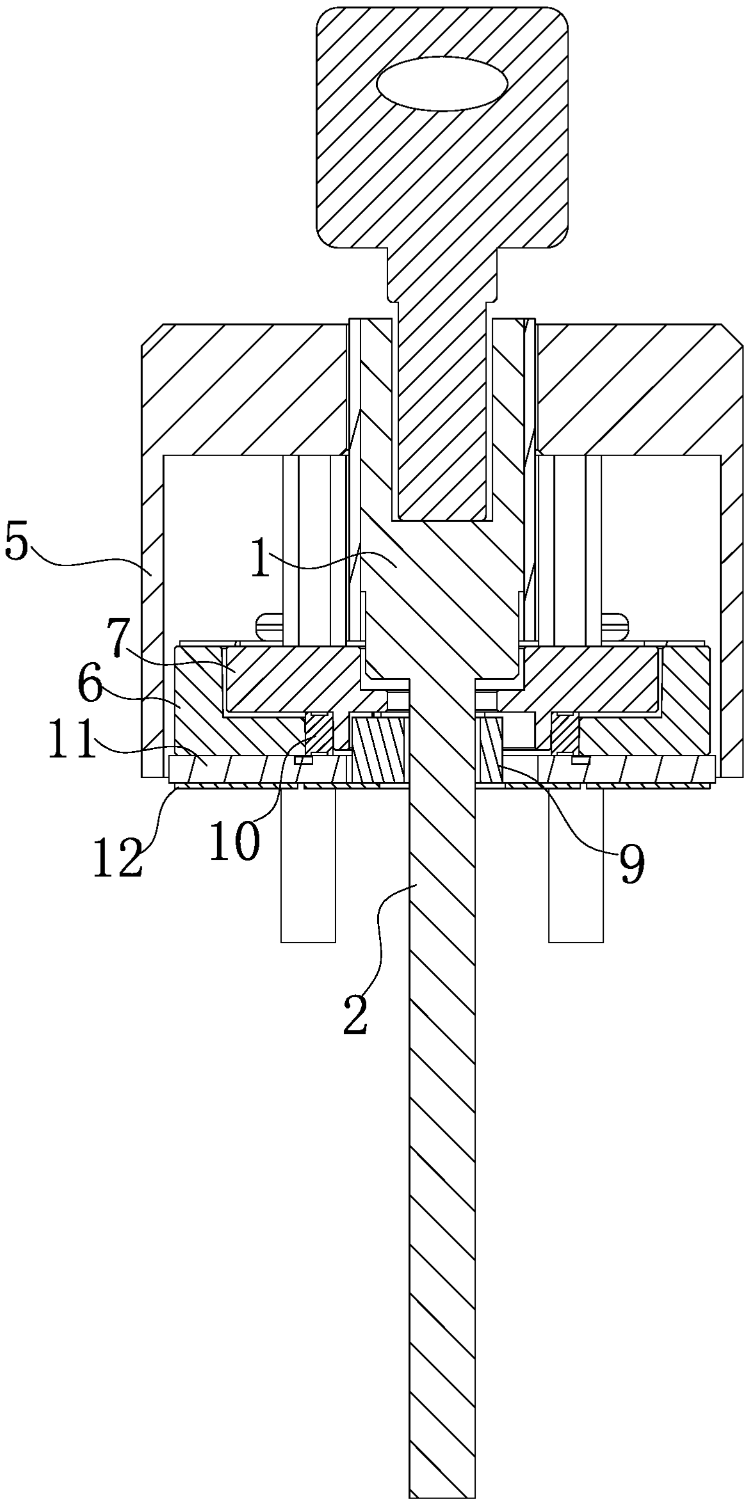
FIG. 6 is a cross-sectional view of a structure related to double-locking on a lock according to an embodiment of the invention.
Figure 7:
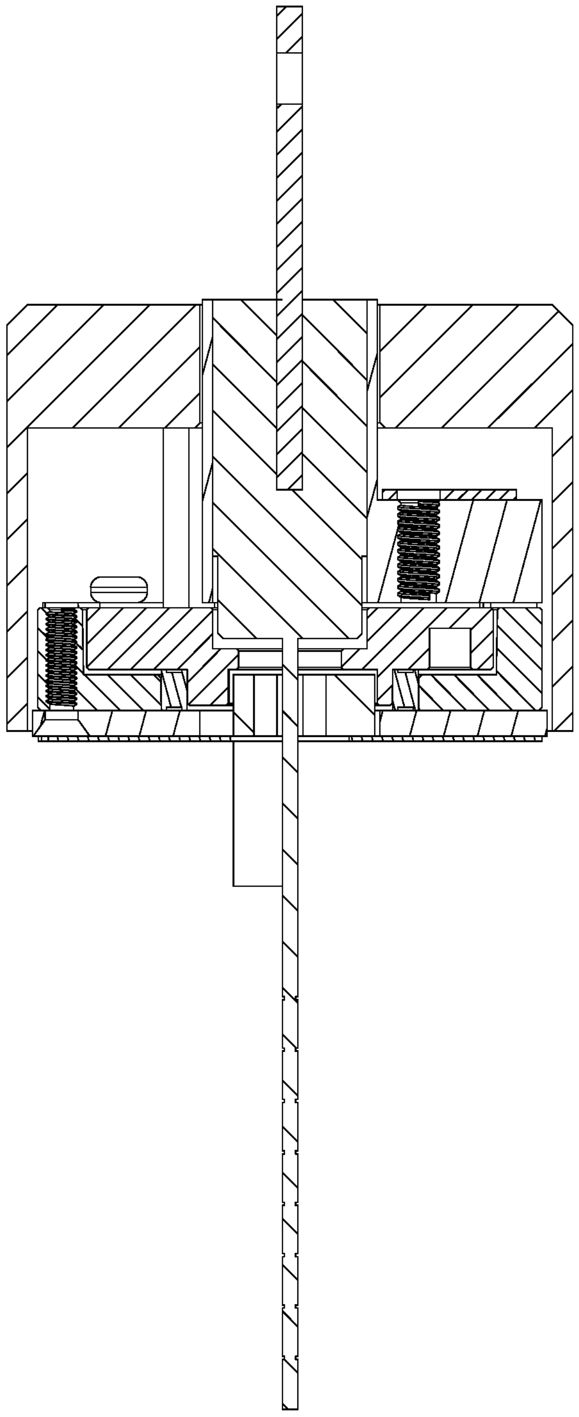
FIG. 7 is another cross-sectional view of a structure related to double-locking on a lock according to an embodiment of the invention.

As shown in FIGS. 6-7, the fixing part 6 is arranged in the open end of the rotating handle 5, and further comprises a bottom plate 11 fixedly connected with the external supporting surface, and the bottom plate 11 is detachably connected with the fixing part 6, that is, the two are connected by screws, which facilitates mounting and dismounting.

As shown in FIG. 5, two circular holes 1101 of the bottom plate 11 are marked with characters "L" and "R" respectively. After the bottom plate 11 and the fixing part 6 are assembled, the two circular holes 1101 correspond to the two stopper mounting positions on the fixing part respectively.

In order to fix the adapter 9 in the axial direction of the fixing part 6 and the rotating part 7, a detachable bottom plate gasket 12 is further arranged on a surface of the bottom plate 11, the bottom plate 11 and the bottom plate gasket 12 are coaxial with the rotating handle 5, the rotating part 7 and the fixing part 6, and axial through holes 1*a* for the cylinder follower 2 to pass through are also formed in the bottom plate 11 and the bottom plate gasket 12, as shown in FIGS. 5-7.

Because the thickness of the adapter 9 is larger than the height of the cylindrical body 702, an outer surface of the adapter 9 protrudes out of the cylindrical body 702 and extends into the axial through hole 1*a* of the bottom plate 11. A diameter of the axial through hole 1*a* in the bottom plate gasket 12 is smaller than a maximum transverse or longitudinal size of the adapter 9, so as to prevent the adapter 9 from moving or falling off along the axial direction of the cylindrical body 702. By means of this structure, the bottom plate gasket 12 can be dismounted easily, so that the adapter 9 can be taken off easily to adjust the straight hole in the adapter 9 through which the cylinder follower 2 passes, that is, the connection mode between the adapter 9 and the cylinder follower 2 is adjusted according to the door opening direction. Therefore, after purchasing the lock, a user can adjust the assembly mode of the adapter 9 and the cylinder follower 2 according to the door opening direction, so as to adapt to both a left-handed door and a right-handed door, and even non-professionals can install the lock.

As shown in FIG. 5, the rotating handle 5 is provided with two connecting columns 503 parallel to the axial direction of the rotating handle inside, the connecting columns 503 are provided with axial threaded holes inside, and the main body 701 of the rotating part 7 is fixed on the two connecting columns 503 by two screws. A fixed end of the connecting column 503 here is in threaded connection with the rotating handle 5.

A circular fixed piece 13 is fixedly arranged on a back of the fixing part 6, an inner diameter of the fixed piece 13 is smaller than an outer diameter of the main body 701, and the rotating part 7 is fixed in the fixing part 6 along the axial direction of the fixing part 6.

As shown in FIGS. 4-5, in order to fix the cylinder 1, a cylinder pressing plate 14 is further provided, which is integrally formed by a U-shaped body 1401 and two connecting pieces 1402 arranged at the lower ends of the U-shaped body 1401 respectively, and the connecting pieces 1402 are perpendicular to two vertical plates of the U-shaped body 1401. To fix the cylinder 1, a fixing portion 101 of the cylinder 1 is sleeved with the U-shaped body 1401, which is fixed to the back of the fixing part 6 by making two or more screws respectively pass through the connecting pieces 1402 and the fixing pieces 13.

Figure 10A:
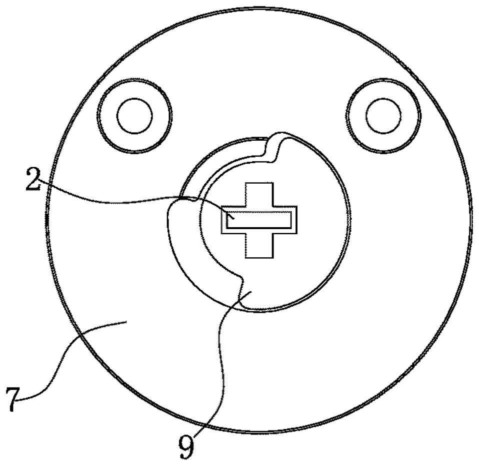
FIG. 10*a* is a diagram of a lock of the embodiment of the invention when the lock is opened in the case of a left-handed door.
Figure 10B:
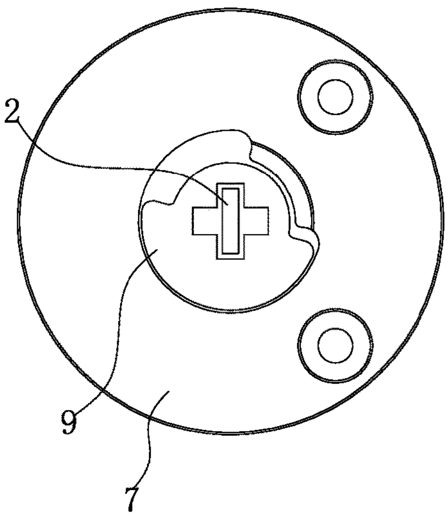
FIG. 10*b* is a diagram of a lock of the embodiment of the invention when the lock is double-locked from the outside in the case of a left-handed door.
Figure 10C:
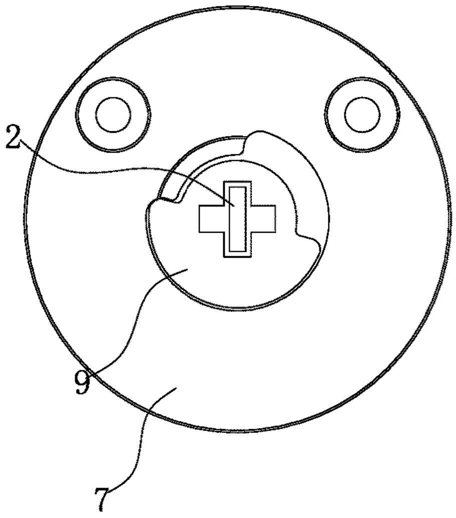
FIG. 10*c* is a diagram of a lock of the embodiment of the invention when the lock is double-locked with a key from the outside or with a door opening knob from the inside in the case of a left-handed door.

As shown in FIGS. 10*a*-10*c*, the positional relationships between the adapter 9 and the rotating part 7 in cases like unlocking and double-locking are illustrated by taking a left-handed door as an example.

As shown in FIG. 10*a*, in the unlocking state, the cylinder follower 2 in the cross through hole 901 is located in one of the straight holes. In this state, a user rotates the rotating handle 5 clockwise from the outside to drive the rotating part 7 to rotate synchronously, the arc-shaped section 703 on the rotating part 7 drives the adapter 9 to rotate, and the adapter 9 drives the cylinder follower 2 to rotate synchronously by no less than 90°, thus realizing double-locking from the outside, which is the state shown in FIG. 10*b*. Based on the state shown in FIG. 10*b*, to unlock with a key from the outside or with the door opening knob 4 from the inside, the cylinder 1 or the door opening knob 4 drives the cylinder follower 2 to rotate counterclockwise, the cylinder follower 2 drives the adapter 9 to rotate synchronously, and the adapter 9 pushes the rotating part 7 to rotate synchronously in the opposite direction by no less than 90°, thus realizing unlocking, that is, returning to the state shown in FIG. 10*a*. Based on the state shown in FIG. 10*a*, to double-lock with a key from the outside or with the door opening knob 4 from the inside, the cylinder 1 or the door opening knob 4 drives the cylinder follower 2 to rotate clockwise, the cylinder follower 2 drives the adapter 9 to rotate synchronously, and the adapter 9 is separated from the arc-shaped section 703 on the rotating part 7 and rotates in the moving space of the cylindrical body 702; and in this process, the adapter 9 does not push the rotating part 7 to rotate, so the rotating handle 5 is stationary, and double-locking from the outside or the inside is also realized, that is, the state shown in FIG. 10*c*. Based on the state shown in FIG. 10*c*, to unlock with a key from the outside or with the door opening knob 4 from the inside, the cylinder 1 or the door opening knob 4 drives the cylinder follower 2 to rotate counterclockwise, the cylinder follower 2 drives the adapter 9 to rotate synchronously, the adapter 9 is separated from the arc-shaped section 703 on the rotating part 7 and rotates in the moving space of the cylindrical body 702; and in this process, the adapter 9 does not push the rotating part 7 to rotate, so the rotating handle 5 is stationary, and unlocking from the outside or the inside is also realized, that is, the state shown in FIG. 10*a*.

To sum up, by means of the above structure, double-locking from the outside is facilitated, and double-locking can be realized without the need to drive the cylinder follower 2 to rotate by the cylinder 1, so a restoration structure is not needed to restore the cylinder 1. Therefore, the invention has the advantages that the structure is simple, cost is low, the adapter 9 is easy to mount and dismount, a user can adjust the installation mode of the adapter 9 and the cylinder follower 2 according to the door opening direction, and even non-professionals can install the lock.

In the above description, it should be noted that the terms such as "install" and "connect" should be understood in a broad sense. For example, it may be fixed connection, detachable connection or integrated connection; and it may be direct connection, indirect connection through intermediate media or internal communication of two elements.

Obviously, the above-described embodiments are only part of the embodiments of the invention, but not all of them. The preferred embodiments of the invention are given in the drawings, but they do not limit the patent scope of the invention. The invention can be implemented in many different forms. These embodiments are provided only for a more thorough and comprehensive understanding of the disclosure of the invention. Any equivalent structure, made by using the contents of the specification and drawings of the invention and directly or indirectly applied to other related technical fields, is within the scope of protection of the invention.

What is claimed is:

1. A lock facilitating double-locking from the outside, comprising a cylinder, a cylinder follower arranged at a front end of the cylinder, and a bolt component connected with the cylinder follower; and further comprising a rotating handle, a fixing part fixed connected with an external supporting surface, the rotating handle being able to rotate relative to the fixing part;

a rotating part fixedly connected with the rotating handle and movably connected with the fixing part;

a stopper arranged on the fixing part, movably connected with the rotating part, and used for limiting a rotation angle of the rotating part relative to the fixing part; and an adapter moveably connected with the rotating part, connect be cylinder follower, and moving with the cylinder follower; wherein when the rotating part rotates, the adapter is pushed to rotate, so as to drive the cylinder follower to rotate to realize double-locking, wherein the cylinder follower is arranged in an axial direction of the rotating handle, the fixing part and the rotating part are both provided with axial through holes, and the fixing part, the rotating part and the adapter are all sleeved on the cylinder follower, wherein the rotating handle is cylindrical, with an opening at one end and a sealing end plate at the other end, wherein the rotating part comprises a main body, a cylindrical body arranged on one surface of the main body, and an arc-shaped section with an arc-shaped cross profile arranged on an inner wall of cylindrical body, an arc-shaped limiting groove is also formed in the surface of the main body, and the limiting groove is located outside the cylindrical body, wherein the adapter is provided with a cross through hole inside, the cross through hole consists of two straight holes which are perpendicular to each other, and the cylinder follower passes through one of the straight holes.

2. The lock facilitating double-locking from the outside as claimed in claim 1, wherein the adapter is integrally formed by a large arc block and a small arc block, two sides of the large arc block protrude from two sides of the small arc block, and two contact vertical faces are formed on the two sides of the large arc block respectively.

3. The lock facilitating double-locking from the outside as claimed in claim 2, wherein the adapter is placed in the cylindrical body and rotates clockwise or counterclockwise relative to the cylindrical body with the cylinder follower as the axis; and when the adapter rotates, after one of the contact vertical faces contacts one end face of the arc section, the adapter stops rotating relative to the cylindrical body, and at this point, a space of not less than 90° exists between the other contact vertical face and another end face of the arc-shaped section for the adapter to rotate reversely.

4. The lock facilitating double-locking from the outside as claimed in claim 3, wherein a circumferential surface of the large arc block of the adapter is in contact with the inner wall of the cylindrical body, and a surface of the arc section is an arc-shaped surface, which is in contact with a circumferential surface of the small arc block.

5. A lock facilitating double-locking from the outside, comprising a cylinder, a cylinder follower arranged at a front end of the cylinder, and a bolt component connected with the cylinder follower; and further comprising a rotating handle;

a fixing part fixedly connected with an external supporting surface, the rotating handle being able to rotate relative to the fixing part;

a rotating part fixedly connected with the rotating handle and movably connected with the fixing part, a stopper arranged on the fixing part, moveably connected with the rotating part, and used for limiting a rotation angle of the rotating part relative to the fixing part; and an adapter moveably connected with the rotating part, connected with the cylinder follower, and moving with the cylinder follower, wherein when the rotating part rotates, the adapter is pushed to rotate, so as to drive the cylinder follower to rotate to realize double-locking, wherein the cylinder follower is arranged in an axial direction of the rotating handle, the fixing part and rotating part are both provided with axial through holes, and the fixing part, the rotating part and the adapter are all sleeved on the cylinder follower, wherein the rotating handle is cylindrical, with an opening at one end and a scaling end plate at the other end, wherein the rotating part comprises a main body, a cylindrical body arranged on one surface of the main body, and an arc-shaped section with an arc-shaped cross profile arranged on an inner wall of the cylindrical body, an arc-shaped limiting groove is also formed in the surface of the main body, and the limiting groove is located outside the cylindrical body, wherein the fixing part is in the shape of a disc, a circular counter bore is formed in one surface of the fixing part, the cylindrical body is sleeved with a bearing, the main body of the rotating part is embedded in the circular counter bore, the bearing is embedded in the axial through hole of the fixing part, and the rotating part can rotate relative to the fixing part.

6. The lock facilitating double-locking from the outside as claimed in claim 5, wherein the fixing part is provided with two stopper mounting positions, the stopper is a screw which vertically passes through the fixing part via one of the mounting positions on the fixing part and is fixed on the fixing part, and a free end of the stopper extends into the limiting groove to limit a maximum range of rotation of the rotating part relative to the fixing part.

7. The lock facilitating double-locking from the outside as claimed in claim 5, wherein the fixing part is arranged in the open end of the rotating handle, and further comprises a bottom plate fixedly connected with the external supporting surface, and the bottom plate is detachably connected with the fixing part.

8. The lock facilitating double-locking from the outside as claimed in claim 7, wherein a detachable bottom plate gasket is further arranged on a surface of the bottom plate, the bottom plate and the bottom plate gasket are coaxial with the rotating handle, the rotating part and the fixing part, and axial through holes for the cylinder follower to pass through are also formed in the bottom plate and the bottom plate gasket.

9. The lock facilitating double-locking from the outside according to claim 8, wherein an outer surface of the adapter protrudes out of the cylindrical body and extends into the axial through hole of the bottom plate, and a diameter of the axial through hole in the bottom plate gasket is smaller than a maximum transverse or longitudinal size of the adapter, so as to prevent the adapter from moving or falling off along the axial direction of the cylindrical body.

10. A lock facilitating double-looking from the outside, comprising a cylinder, a cylinder follower arranged at a front end of the cylinder, and a bolt component connected with the cylinder follower, and further comprising a rotating, handle;

a fixing part fixedly connected with an external supporting surface, the rotating handle being able to rotate relative to the fixing part;

a rotating part fixedly connected with the rotating handle and movably connected with the fixing part;

stopper arranged on the fixing part, movably connected with the rotating part, and used for limiting a rotation angle of the rotating part relative to the fixing part; and an adapter moveably connected with the rotating part, connected with the cylinder follower, and moving with the cylinder follower, wherein when the rotating part rotates the adapter is pushed to rotate, so as to drive the cylinder follower to rotate to realize double-locking, wherein the cylinder follower is arranged in an axial direction of the rotating handle, the fixing part and the rotating part are both provided with axial through holes, and the fixing part, the rotating part and the adapter all sleeved the cylinder follower, wherein the rotating handle is cylindrical, with an opening one end and a sealing end plate at the other end, wherein the rotating part comprises a main body, a cylindrical body arranged on one surface of the ma in body, and an arc-shaped section with an arc-shaped cross profile arranged on an inner wall of the cylindrical body, an arc-shape limiting groove is also formed in the surface of the main body, and the limiting groove is located outside the cylindrical body, wherein the rotating handle is provided with two connecting columns parallel to the axial direction of the rotating handle inside, the connecting columns are provided with axial threaded holes inside, and the main body of the rotating part is fixed on the two connecting columns by two screws.

11. The lock facilitating double-locking from the outside as claimed in claim 5, wherein a circular fixed piece is fixedly arranged on a back of the fixing part, an inner diameter of the fixed piece is smaller than an outer diameter of the main body, and the rotating part is fixed in the fixing part along the axial direction of the fixing part.

* * * * *